(12) United States Patent
Morse et al.

(10) Patent No.: US 10,358,376 B2
(45) Date of Patent: *Jul. 23, 2019

(54) METHOD AND APPARATUS FOR CREATING COHERENT BUNDLE OF SCINTILLATING FIBERS

(71) Applicant: Brown University, Providence, RI (US)

(72) Inventors: Theodore F. Morse, Providence, RI (US); Rajiv Gupta, Wayland, MA (US); Avilash Cramer, Lynnfield, MA (US); Christopher Bull, Rehoboth, MA (US); Paul Waltz, Seekonk, MA (US); Angus Kingon, Providence, RI (US)

(73) Assignee: BROWN UNIVERSITY, Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/626,784

(22) Filed: Jun. 19, 2017

(65) Prior Publication Data

US 2017/0362114 A1    Dec. 21, 2017

Related U.S. Application Data

(63) Continuation-in-part of application No. 15/449,205, filed on Mar. 3, 2017, which is a continuation of
(Continued)

(51) Int. Cl.
*G01T 1/00* (2006.01)
*C03B 37/012* (2006.01)
(Continued)

(52) U.S. Cl.
CPC ........ *C03B 37/01262* (2013.01); *B29C 43/00* (2013.01); *B29C 43/58* (2013.01);
(Continued)

(58) Field of Classification Search
CPC ..... G01T 1/201; G01T 1/2033; G02B 27/023; C03B 37/01262; C03B 2203/40;
(Continued)

(56) References Cited

U.S. PATENT DOCUMENTS 4,022,647 A    5/1977    Yevick
4,931,646 A    6/1990    Koechner et al.
(Continued)

FOREIGN PATENT DOCUMENTS

FR    2853084 A1    10/2004
GB    2433447 A  *  6/2007    ............. C30B 23/02
(Continued)

OTHER PUBLICATIONS

Rupert et al., "Bismuth-loaded plastic scintillators for gamma-ray spectroscopy," Jan. 2012, A Letters Journal Exploring, The Frontiers of Physics, pp. 22002-p1 to 22002-p4.*
(Continued)

*Primary Examiner* — Kiho Kim
(74) *Attorney, Agent, or Firm* — Adler Pollock & Sheehan P.C.

(57) ABSTRACT

A method and apparatus to manufacture a coherent bundle of scintillating fibers is disclosed. A method includes providing a collimated bundle having a glass preform with capillaries therethrough known in the industry as a glass capillary array, and infusing the glass capillary array with a scintillating polymer or a polymer matrix containing scintillating nanoparticles.

3 Claims, 8 Drawing Sheets

Related U.S. Application Data application No. 14/640,069, filed on Mar. 6, 2015, now Pat. No. 9,611,168.

(60) Provisional application No. 61/949,192, filed on Mar. 6, 2014, provisional application No. 62/351,598, filed on Jun. 17, 2016, provisional application No. 62/351,639, filed on Jun. 17, 2016.

(51) Int. Cl.

| | | |
|---|---|---|
| *G01T 1/20* | (2006.01) | |
| *B29C 43/00* | (2006.01) | |
| *G01T 1/203* | (2006.01) | |
| *B29D 11/00* | (2006.01) | |
| *B29C 43/58* | (2006.01) | |
| *G02B 27/02* | (2006.01) | |
| *B82Y 15/00* | (2011.01) | |
| *B29K 27/12* | (2006.01) | |
| *B29K 505/02* | (2006.01) | |
| *B29K 105/16* | (2006.01) | |
| *B29K 23/00* | (2006.01) | |
| *B29K 25/00* | (2006.01) | |
| *B29C 43/18* | (2006.01) | |
| *B29K 77/00* | (2006.01) | |
| *B29L 11/00* | (2006.01) | |
| *B29K 709/08* | (2006.01) | |
| *B29K 505/08* | (2006.01) | |

(52) U.S. Cl.
CPC .... *B29D 11/0074* (2013.01); *B29D 11/00701* (2013.01); *G01T 1/201* (2013.01); *G01T 1/2033* (2013.01); *G02B 27/023* (2013.01); *B29C 43/003* (2013.01); *B29C 43/18* (2013.01); *B29C 2043/5808* (2013.01); *B29K 2023/12* (2013.01); *B29K 2025/06* (2013.01); *B29K 2027/12* (2013.01); *B29K 2077/00* (2013.01); *B29K 2105/162* (2013.01); *B29K 2505/02* (2013.01); *B29K 2505/08* (2013.01); *B29K 2709/08* (2013.01); *B29L 2011/00* (2013.01); *B82Y 15/00* (2013.01); *C03B 2203/40* (2013.01)

(58) Field of Classification Search
CPC ....... B29C 43/00; B29C 43/58; B29C 43/003; B29C 43/18; B29C 2043/5808; B29D 11/0074; B29K 2023/12; B29K 2025/06; B29K 2027/12; B29K 2077/00; B29K 2105/162; B29K 2505/02; B29K 2505/08; B29L 2011/00; B82Y 15/00

See application file for complete search history.

(56) References Cited

U.S. PATENT DOCUMENTS

| | | | |
|---|---|---|---|
| 5,308,986 | A | 5/1994 | Walker |
| 6,271,510 | B1 | 8/2001 | Boxen |
| 6,384,400 | B1 * | 5/2002 | Albagli ................. G01T 1/2002 |
| | | | 250/208.1 |
| 8,477,906 | B2 | 7/2013 | Morse et al. |
| 2002/0021877 | A1 * | 2/2002 | Kyogoku ................. G02B 6/02 |
| | | | 385/124 |
| 2002/0072111 | A1 | 6/2002 | Clarkin et al. |
| 2005/0054165 | A1 * | 3/2005 | Ahn ........................ C23C 16/40 |
| | | | 438/287 |
| 2008/0241041 | A1 * | 10/2008 | Clothier ................. B82Y 30/00 |
| | | | 423/263 |
| 2009/0014662 | A1 | 1/2009 | Suhami |
| 2012/0314990 | A1 * | 12/2012 | Pitwon ................. G02B 6/1221 |
| | | | 385/14 |
| 2014/0323946 | A1 | 10/2014 | Bourke, Jr. et al. |
| 2015/0131937 | A1 | 5/2015 | Shinji et al. |

FOREIGN PATENT DOCUMENTS

| | | |
|---|---|---|
| RU | 119129 U1 | 8/2012 |
| SE | 200800231 A | 8/2009 |
| WO | WO 9002961 A * | 3/1990 |
| WO | WO-2009008911 A2 | 1/2009 |

OTHER PUBLICATIONS

Siegmund et al., "Glasses as active and passive components for scintillating fiber detectors," 1992, Proceedings of SPIE, vol. 1737, pp. 2-13.*

International Search Report, International Application No. PCT/US2015/019114; dated Jun. 10, 2015, 2 pages.

Schott North America, Inc. "An introduction to Fiber Optic Imaging", Feb. 2007, 93 pages.

T.F. Morse, "Final Report: Clinical Applications of Specialty Fibers, and novel biomedical Photonic concepts," Report date: Jun. 18, 2009, downloaded from www.dtic.mil/dtic/tr/fulltext/u2/a585152.pdf.

* cited by examiner

10,358,376 B2

METHOD AND APPARATUS FOR CREATING COHERENT BUNDLE OF SCINTILLATING FIBERS

CROSS REFERENCE TO RELATED APPLICATIONS

This application is a continuation-in-part (CIP) of U.S. patent application Ser. No. 15/449,205, filed Mar. 3, 2017, which is a continuation of U.S. patent application Ser. No. 14/640,069, filed Mar. 6, 2015 (now U.S. Pat. No. 9,611,168), which claims benefit from U.S. Provisional Patent Application Ser. No. 61/949,192, filed Mar. 6, 2014, U.S. Provisional Patent Application Ser. No. 62/351,598, filed Jun. 17, 2016, and U.S. Provisional Patent Application Ser. No. 62/351,639, filed Jun. 17, 2016. All of these prior applications are incorporated by reference in their entirety.

BACKGROUND OF THE INVENTION

1. Field of the Invention

The present patent document relates generally to coherent bundles of scintillating fibers also known as glass capillary arrays used as detectors for x-rays used for medical, scientific and engineering imaging applications, and methods and apparatuses for the creation thereof.

2. Background of the Related Art

Coherent bundles of scintillating fibers are useful for detecting x-rays and are placed opposed to a CCD camera or integrated with a CMOS photodetector. Incident x-rays activate the scintillators in individual fibers, which then emit visible light to the camera, which then generates an image. Much as in an optical fiber, the scintillating light in the fiber (caused by x-rays), reflects the light down to the sensor: Total Internal Reflection. Coherent bundles are used extensively in medical, scientific and engineering applications. Particularly in the medical imaging field, coherent bundles are instrumental in creating images later used to diagnose cancer, heart disease and other ailments. In engineering fields, parts may be imaged to determine if they have micro-fractures, which may lead to premature failure of the part, such as turbine blades in a jet engine. In domestic security, x-ray imaging is used for scanning of packages, luggage and persons for weapons and contraband.

Consequently, it is desirable to have high resolution images. The feature size of the scintillators is correlated with the maximum resolution that can be imaged. Consequently, it is desirable to have coherent bundles of fibers with small diameter scintillating fibers in order to increase resolution in images.

Therefore, there is a need in the art for coherent bundles of scintillating fibers that produce higher resolution images.

SUMMARY OF THE INVENTION

The method of making and coherent bundle described herein advance the prior art by providing a coherent bundle of scintillating fibers and method of making that increases the resolution of x-ray images in to the single-digit micron range by controlling the pressure during manufacturing of the coherent bundle. Specifically, the method of manufacturing a coherent bundle of scintillating fibers, includes providing a collimated bundle having a glass preform with a plurality of capillaries. A transparent scintillating polymer (i.e., inorganic bismuth is incorporated into the polymer in molecular form, not as second phase particles) or alternatively a polymer matrix of a transparent polymer infused with scintillating nanoparticles is placed on top of the collimated bundle. Pressure is applied to the polymer matrix, driving it into the capillaries while a back pressure is applied to the collimated bundle thereby reducing the risk of failure of the collimated bundle.

In one embodiment, a pressure vessel is provided that uniquely provides pressure to force the transparent scintillating polymer or polymer matrix into the collimated bundle and back pressure to moderate the tension to the collimated bundle cause by the pressure. The pressure vessel includes an inner wall forming a chamber inside the pressure vessel and top surface defining a first opening into the chamber. An inner shoulder extends inwardly from the inner wall of the pressure chamber and forms support for a collimated bundle. A surface defining a bore and second opening into the chamber below the inner shoulder is also included. An anvil is configured and arranged to apply pressure to the pressure chamber of the pressure vessel through the first opening. A valve connected to the bottom opening is configured and arranged to supply and control back pressure to the chamber.

In another aspect, the invention features a method including providing a collimated bundle having a glass preform with a plurality of capillaries therethrough, prepolymerizing a scintillating polymer on top of the collimated bundle, drawing the scintillating polymer into the capillaries by capillary pressure, and completing the polymerization of the scintillating polymer.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 3:
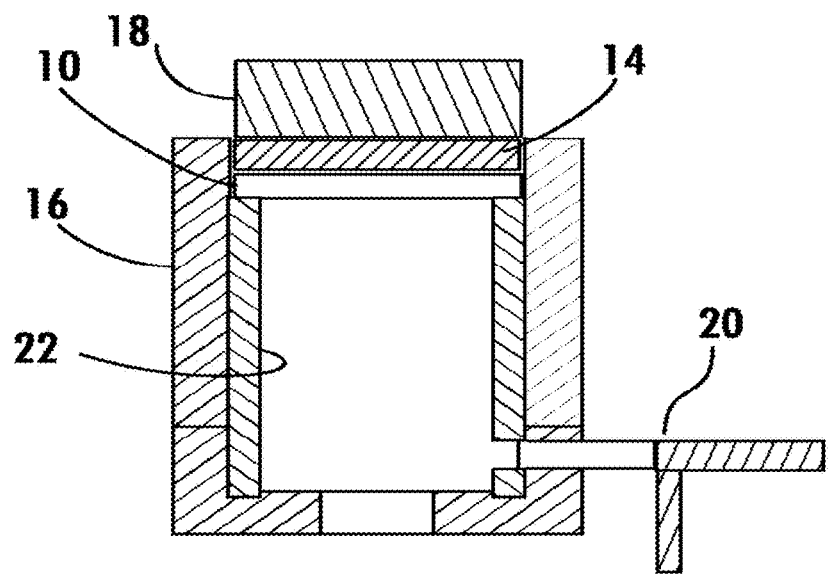
FIG. 3 is an illustration of a pressure vessel having a collimated bundle and polymer matrix loaded and ready for pressing.
Figure 4:
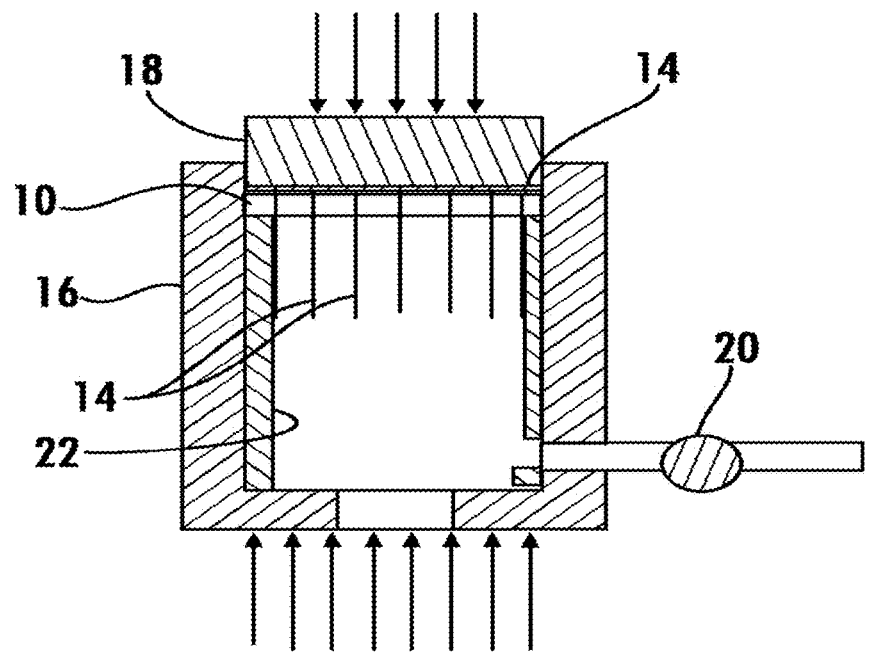
FIG. 4 is an illustration of a pressure vessel with pressure being applied to the polymer matrix while back pressure is applied to the collimated bundle.
Figures 10A, 10B:
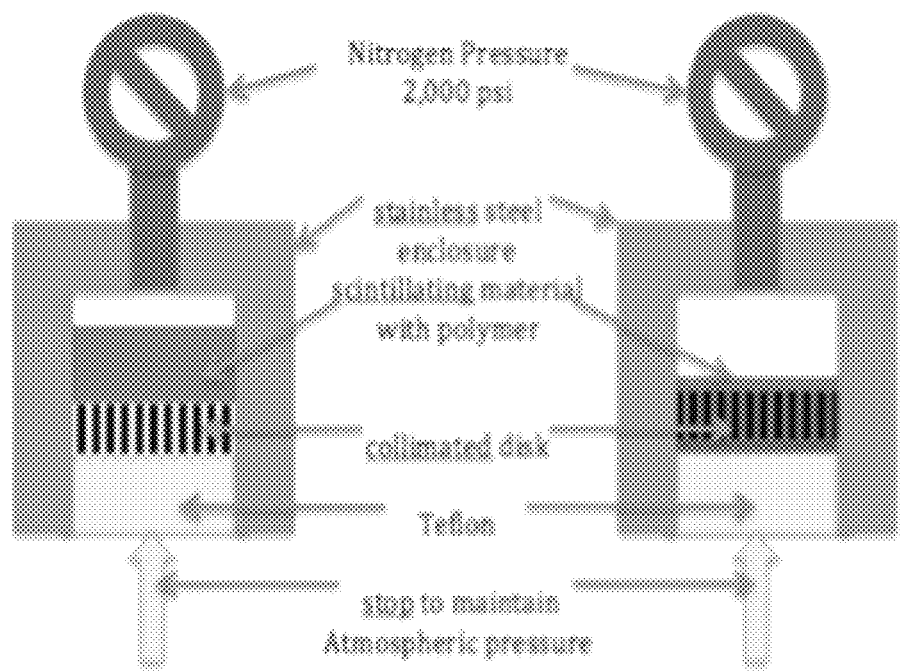
FIG. 10A is an illustration of an alternative method of pressing a polymer matrix into a collimated bundle.
FIG. 10B is an illustration of an alternative method of pressing a polymer matrix into a collimated bundle, showing the polymer matrix being pressed into the capillaries of the collimated bundle.

One purpose of this invention if to provide collimation to the x-rays. Referring now to FIGS. 3 and 4, the method and apparatus to manufacture a coherent bundle of scintillating fibers is shown generally. As will be described in greater detail below, in the method and apparatus, a transparent scintillating polymer 14 or polymer matrix of a transparent polymer and nanoparticle scintillators is placed on top of a collimated bundle 10 having a plurality of capillaries and pressed in a pressure vessel 16 until the transparent scintillating polymer 14 or polymer matrix is forced into the capillaries. Pressure is applied via an anvil 18. To prevent fracturing of the collimated bundle 10 during pressing, back pressure is supplied to the pressure vessel 16 via a valve 20, which controls a supply of high pressure gas. Alternatively, as shown in FIGS. 10A and 10B, the back pressure may also be supplied by a press and support to the collimated bundle is provided by a high melting point thermoplastic. Heat may be applied to the transparent scintillating polymer 14 or polymer matrix to speed the pressing operation.

Figure 1:
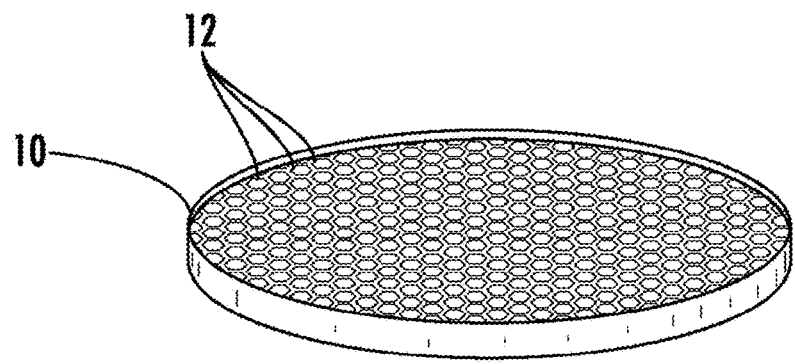
FIG. 1 is a perspective view of a collimated bundle having a plurality of capillaries.
Figure 2A:
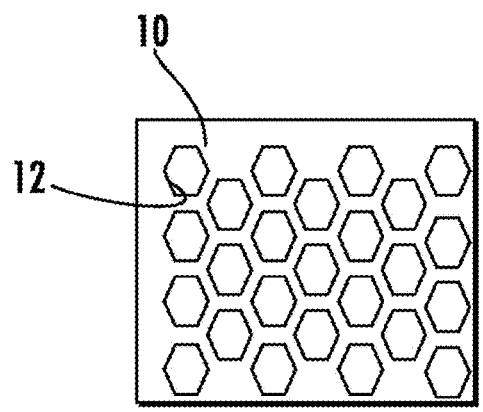
FIG. 2A is an illustration of a collimated bundle with hexagonal capillaries.
Figure 2B:
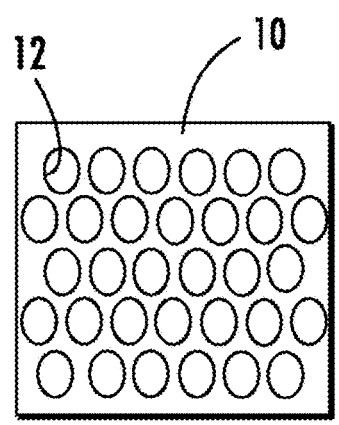
FIG. 2B is an illustration of a collimated bundle with circular capillaries.

Referring back now to FIG. 1, an illustration of collimated bundle 10 is shown generally at 10. Collimated bundles 10 are formed from glass from preforms that are drawn, stacked into bundles, and redrawn many times. The voids between the drawn glass fibers form the capillaries 12 with a characteristic dimension as small as 3-15 microns, although they may be as large as 50 microns. There may be as many as 4 million capillaries per square centimeter of collimated bundle. The capillaries have a cross-sectional shape. FIG. 2A shows a collimated bundle 10 having a plurality of hexagonal capillaries 12. FIG. 2B shows an illustration of a collimated bundle 10 having a plurality of circular capillaries 12. Other profiles or shapes of the capillaries 12 may be formed. The collimated bundles 10 are formed into round or rectangular disks and may be about 25 mm in diameter or as large as 30 cm by 30 cm, and 0.1 to 2 mm thick with an index of refraction of 1.49-1.53, typically of borosilicate glass. Other diameters and thicknesses may be used depending on the desired size of the detector.

In one embodiment, the scintillating material is formed by embedding scintillating nanoparticles into a transparent polymer to create a scintillating material, which will subsequently be forced into the capillaries 12 of the collimated bundle 10. Alternatively, a polymer may be used which itself is scintillating. We prefer using polyvinylcarbazole containing 40% triphenolbismuth which gives a scintillation yield of about 30,000 Photons/MeV, although other scintillating polymers may be used. The scintillating polymer or polymer matrix with scintillating nanoporticles 14 forms the 'cores' of our scintillating fibers, and the glass of the collimated bundle 10 the 'cladding' on the fibers. The efficiency of channeling of the emitted photons is dependent on the difference in refractive index between core and cladding—the larger the difference the better the photon channeling or internal reflection. As stated above, the latter has a refractive index of 1.49-1.53; the polymer should have a refractive index of at least 1.70. Generally, the addition of scintillating compounds or scintillating nanoparticles increases the refractive index of the polymer, as they are typically materials with high atomic mass mass. Suitable polymers have high refractive index, and high optical transparency, and therefore there are many suitable candidates. We prefer polyvinylcarbazole, polystyrene, nylon and polypropylene, other transparent polymers that have a refractive index higher than 1.59. Suitable nanoparticle scintillator materials are LaBr3:Ce, LSO:Ce and GdAlO3:Ce. Other nanoparticle scintillator materials may be used. U.S. Publication 2008/0093557 and U.S. Publication 2010/2072234, incorporated herein by reference, describe scintillator materials and methods of embedding them in plastics.

It is important to note that the resolution limit of the coherent bundle is almost that of the material itself. Accordingly, by using scintillating fibers of 3-15 microns, x-rays with a resolution in the micron range will be detected, a significant improvement over both computed axial tomography (CAT), which had a resolution of 150 microns, and current digital x-ray detectors, which have a resolution of 70-200 microns.

The collimated bundle 10 is able to withstand a force required to push the transparent scintillating polymer 14 or the polymer matrix having nanoparticle scintillators through the capillaries 12 in the collimated bundle disk, which may be made from borosilicate glass, which is able to withstand 63-81 GPa in compression (the lower bound is equivalent to 6.2E4 atmospheres). It is much less strong in tension, and the glass of the collimated bundle will crack under the bending load.

Referring to FIGS. 3 and 4, a successful way to push scintillating particles into the capillaries 12 of the collimated bundle 10 is described below. A scintillating polymer (such as 40%/triphenolbismuth polyvinylcarbazole) is infused into the cores of the coherent bundle. It may also be nanoparticle scintillators, forming a polymer matrix 14, infused into the capillaries 12 of the collimated bundle 10. To avoid damaging the collimated bundle 10, sufficient back pressure will be applied on the exit side of the capillaries 12 so that the unbalanced force on the collimated bundle 10 (i.e. tension) is able to withstand the critical fracture load of bending.

Figure 5:
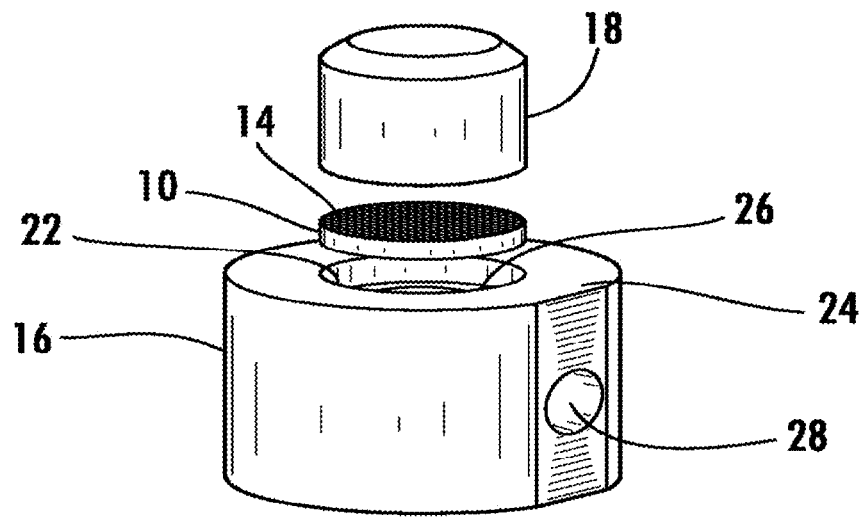
FIG. 5 shows an exploded view of an exemplary pressure vessel.
Figure 6:
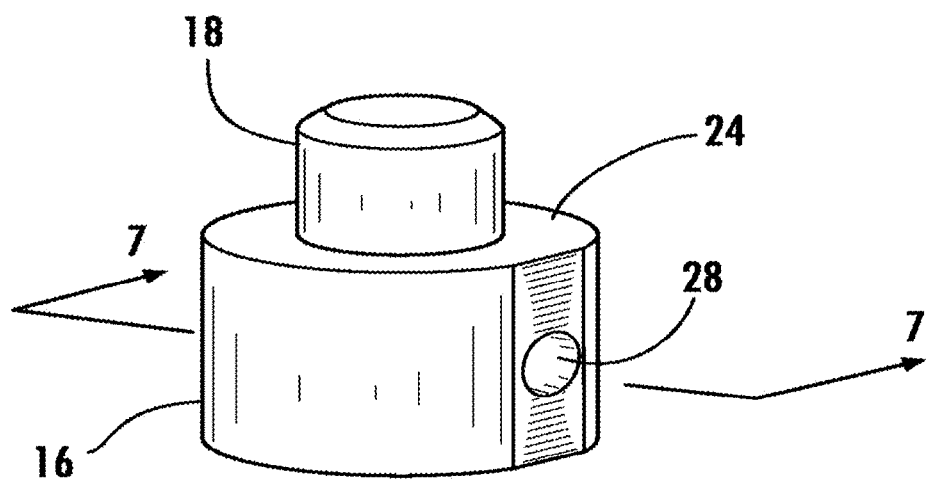
FIG. 6 shows a perspective view of an exemplary pressure vessel.
Figure 7:
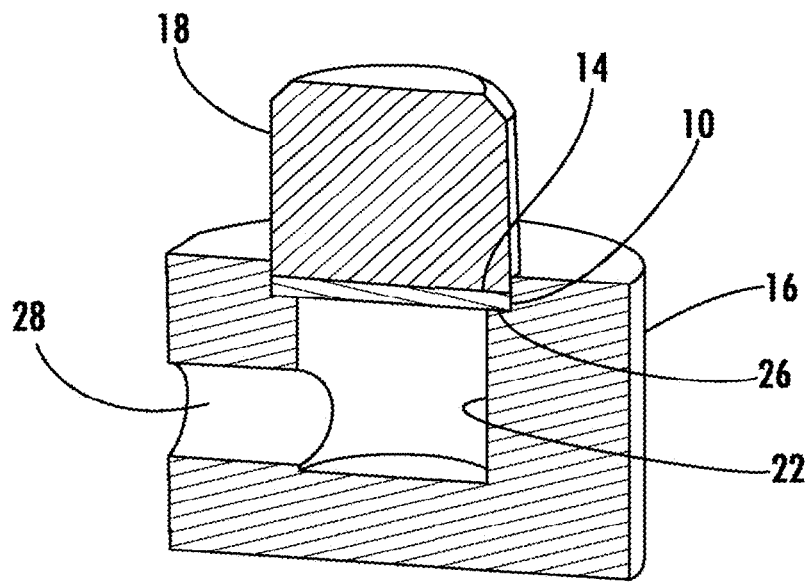
FIG. 7 shows a cross-section view through line 7-7 of FIG. 6.

FIGS. 5-7 show an exemplary embodiment of a pressure vessel 16 configured to force the transparent scintillating polymer 14 or the polymer matrix having nanoparticle scintillators into the capillaries 12 of the collimated bundle 10. The pressure vessel 16 is a cylindrical structure having an inner wall 22 forming a chamber inside the pressure vessel 16. The pressure vessel includes a top surface 24, which with the inner wall 22 define a first opening into the chamber where the collimated bundle 10 and Transparent scintillating polymer 14 or the polymer matrix having nanoparticle scintillators are loaded for pressing. An inner shoulder 26 extends inwardly from the inner wall of the pressure chamber forming support for a collimated bundle 10 and Transparent scintillating polymer 14 or the polymer matrix having nanoparticle scintillators stack. A surface defining a bore 28 and second opening into chamber is below the inner shoulder 26 and consequently beneath the collimated bundle 10 and transparent scintillating polymer 14 or the polymer matrix having nanoparticle scintillators stack (when loaded into the pressure vessel 16). An anvil 18 is placed on top of the polymer matrix 14 and collimated bundle 10 for applying pressure to the pressure chamber of the pressure vessel through the first opening. During operation, pressure is applied to the anvil 18, via a press, which presses the transparent scintillating polymer 14 or the polymer matrix having nanoparticle scintillators, forcing it through the capillaries 12.

An alternate way of forcing the scintillation polymer into the holes of the capillary, are as follows. In FIG. 10A, and FIG. 10B, a pressurized vessel is constructed that will force the scintillating polymer (at 1,000-2,000 psi) on the upper surface, and atmospheric pressure at the lower surface. The Teflon® has prevented the collimated disk from cracking. Optionally, heat may be applied through the anvil 18 and/or the pressure vessel 16 to the transparent scintillating polymer 14 or the polymer matrix having nanoparticle scintillators to soften the polymer matrix 14 and speed the pressing operation.

Figure 8:
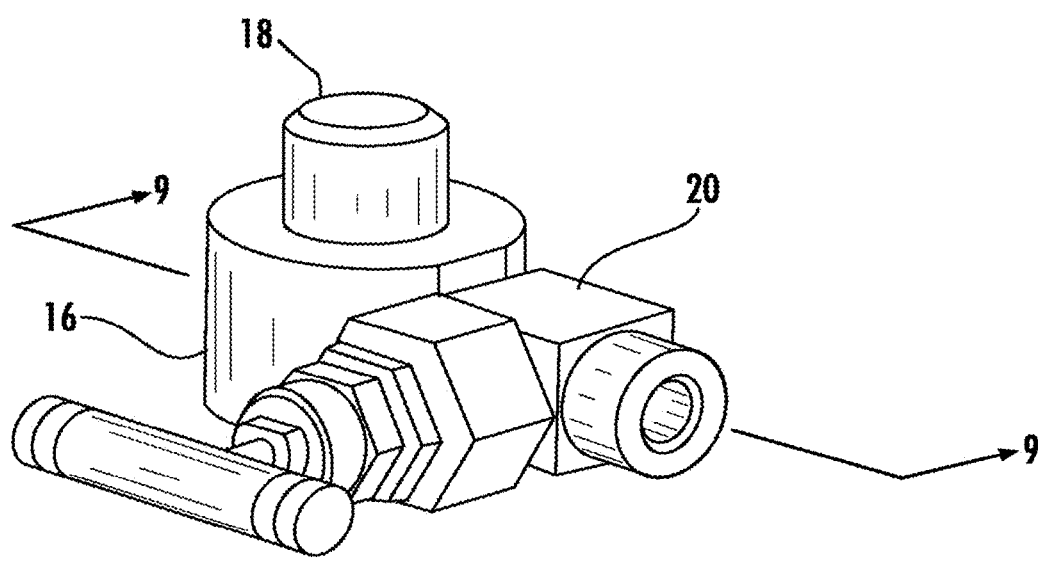
FIG. 8 shows a perspective view of an exemplary pressure vessel with a valve to supply and control back pressure attached thereto.
Figure 9:
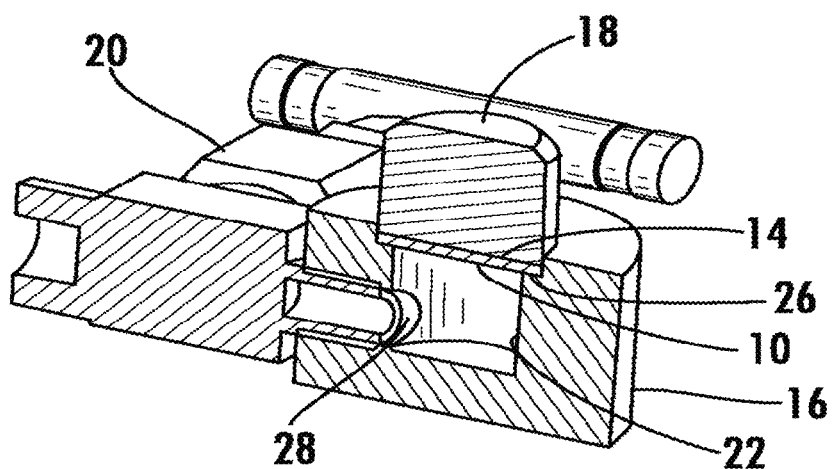
FIG. 9 is a cross-section view through line 9-9 of FIG. 8.

Referring to FIGS. 8 and 9, a valve connected to the bottom opening and is configured to supply and control back pressure to the chamber. Preferably a high pressure gas is used to supply the back pressure. The valve may be a needle valve.

The technique for accomplishing the creation of the coherent bundle of scintillating fibers is demonstrated in the following:

From Poiseuille's law, the volumetric flow rate Q through a single capillary of radius r and length L1, subject to a pressure difference $\Delta P$, for a fluid with absolute viscosity $\eta$ is given as $$Q = \frac{\pi r^4 \Delta P}{8\eta L_1}$$

The pressure distribution is linear along the capillary length. If we depict the capillaries as comprising a collimated bundle, the pressure distribution is linear throughout and the same across each capillary. In the scheme shown there will be no pressure drop between the collimated bundle and the exit disk because the pressure drop created by the capillaries is much greater than that created by the much larger diameter pressure cell.

$$\Delta P_{pressure\ vessel} = \Delta P\left(1 - \frac{L_1}{L_{total}}\right)$$

The total flow rate of the polymer through the disk is given by the flow through a single capillary times the number of capillaries, which we calculated here as the ratio of the collimated bundle area to a single capillary area. The total flow rate is also equal to the volume of the collimated bundle divided by the time it takes to fill the capillaries in the collimated bundle.

$$Q_{total} = \frac{\pi r^4 \Delta P_1}{8\eta L_1} \frac{R^2}{r^2} = \frac{\pi R^2 L_1}{t}$$

If the exit valve is set at the pressure that the disk experiences, there will be a constant pressure along the whole of the coherent bundle. If the valve were sealed, the pressure vessel would be at the equal to the pressure across the piston. If the valve were open, the stress of the tension would rupture the glass.

$$t\Delta P = \frac{8\eta}{1 - \frac{L_1}{L_{total}}} \frac{L_1^2}{r^2}$$

We will provide for the pressure drop to be the equivalent of the flow through a capillary bundle. It is provided for an adjustment of the valve settings, and it corresponds to the $$L_{total} = L_1 + L_{valve}$$

The total resistance shall be given by the sum of the thickness of the coherent bundle, plus the resistance of the valve in the outflow.

$$\Delta P_1 = \Delta P\left(1 - \frac{L_1}{L_1 + L_{valve}}\right)$$

In a 25 mm collimated bundle the pressure and times may therefore be calculated. Specifically, R=25 mm, q=200 Pa·s, $L_1$=2 mm, r=2.5×10$^{-6}$ Consequently, the volume of the collimated bundle is:

$$\pi R^2 \times L_1/2 = 490.8$$

Consequently, flow through the collimated bundle to infiltrate the capillaries is:

$$t\Delta P_1 = 1.024 \times 10^{+9}$$

The pressure relief valve is equal to the collimated bundle in the first case cited below: it is equal to the 2 mm thickness. In the second case, however, it is equal to 18 mm.

$$A = \Delta P_1 = \Delta P\left(1 - \frac{2}{2+2}\right)$$

$$B = \Delta P_1 = \Delta P\left(1 - \frac{2}{2+18}\right)$$

The Q refers to the mass flow in each of the respective cases, i.e. 490.8/t. The values for a 25 mm disk with 2 mm thickness may be tabulated as:

| atm | Pa | t | A | Q | t | B | Q |
|---|---|---|---|---|---|---|---|
| 1000 | 1.01E8 | 20.2 | 5.05E7 | 24.25 | 10.3 | 9.9E7 | 43.84 |
| 750 | 7.59E7 | 27.01 | 3.78E7 | 18.77 | 14.9 | 6.83E7 | 32.72 |
| 500 | 5.06E7 | 40.47 | 2.79E7 | 12.87 | 22.5 | 4.55E7 | 21.83 |
| 250 | 2.53E7 | 81.26 | 1.26E7 | 6.01 | 45.1 | 2.27E7 | 10.88 |

Referring to FIGS. 10A and 10B, an alternative method of forming the coherent bundle of scintillating fibers is shown where a press is configured to apply pressure to the transparent scintillating polymer 14 or the polymer matrix having nanoparticle scintillators and back pressure to the collimated bundle 10 simultaneously. In this alternative method, the collimated bundle 10 is supported with a high melting point thermoplastic 30 such as polytetrafluoroethylene (i.e., Teflon).

Therefore, it can be seen that the present invention provides a unique solution to providing a coherent bundle of scintillating fibers that has markedly increased resolution than prior art x-ray detectors, thereby resulting in higher resolution and more accurate images in medical, engineering and scientific imaging using x-ray, CT or CAT scanning technologies. The coherent bundle of scintillating fibers may also be used in other fields, such as domestic security and non-destructive testing.

As mentioned above, in an X-ray computed tomography (CT) scanner used in, for example, clinical practice, a scintillator receives X-rays passing through a subject, and light emitted from the scintillator is detected by photodetectors. When a scintillator material of the scintillator-based detector is exposed to particle radiation, the scintillator material absorbs energy of incoming particles and scintillates, remitting the absorbed energy in the form of photons. A photon sensor of the scintillator-based detector detects the emitted photons.

In the present invention, a scintillating polymer is mixed with nanoparticles of $ZrO_2$, or $TiO_2$, or other inorganic nanoparticles that are not subject to X-ray degradation. For example, triphenylbismuth loaded with polyvinlycarbazol may be used as a vehicle that accepts nanoparticles of $ZrO_2$. It has a refractive index of 1.7 and the addition of nanoparticles of $ZrO_2$ (with a refractive index of about 2.2 for visible light) increases the effective refractive index considerably. Thus $ZrO_2$, or $TiO_2$, can improve the total internal reflection of the emitted photons, i.e., better confines them in the capillary waveguide by increasing $n_2/n_1$.

Figure 11:
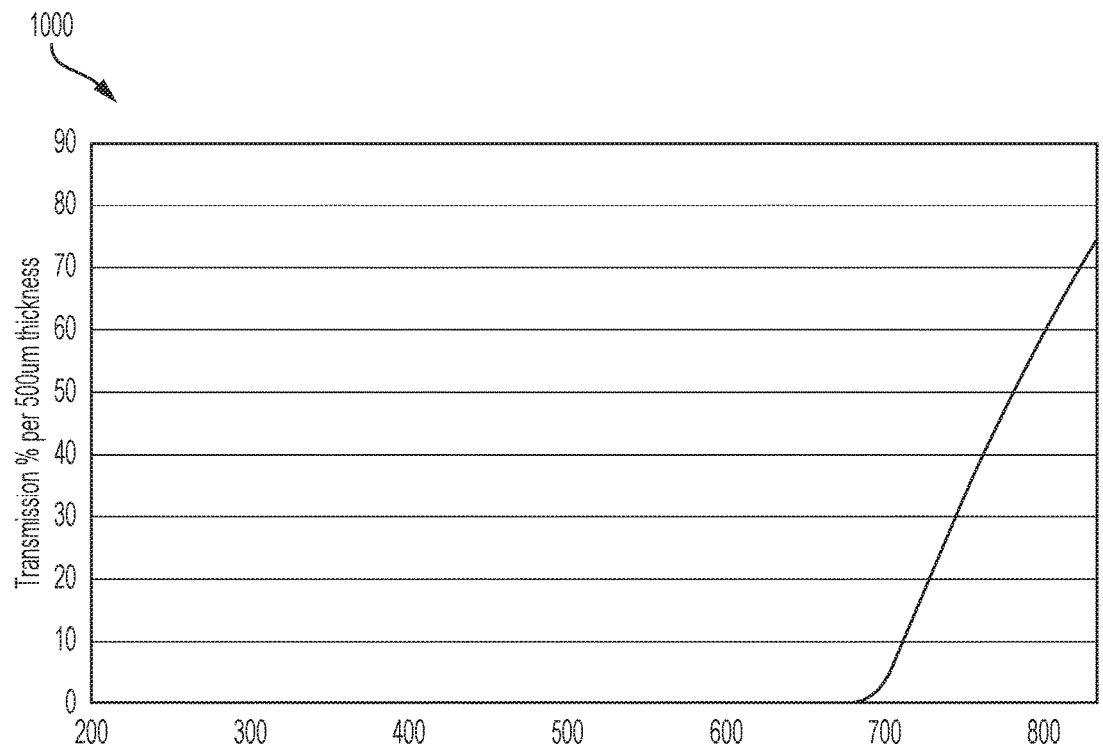
FIG. 11 illustrates the cladding is made of a "dark" glass (scintillating absorbing).
Figure 13:
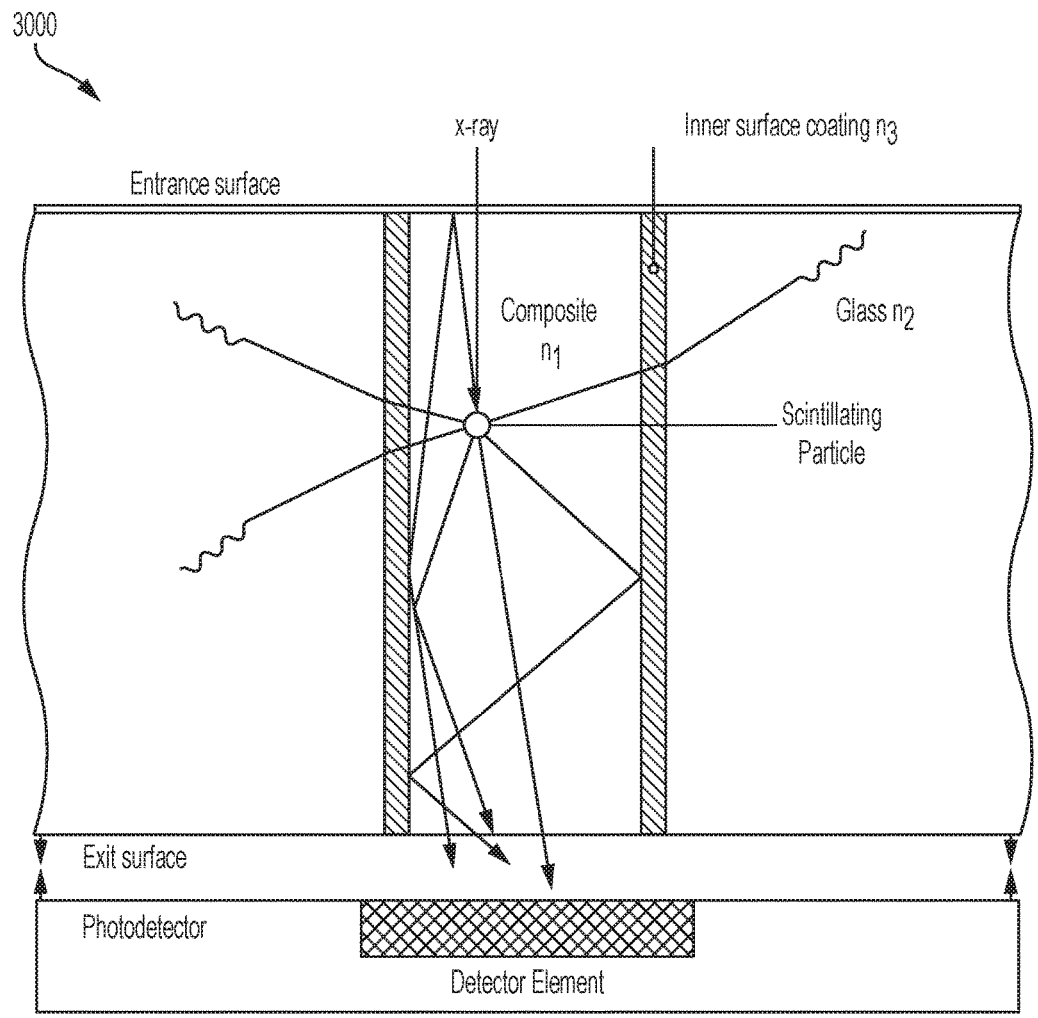
FIG. 13 is an exemplary schematic.

As shown in FIG. 11, a graph 1000 illustrates that the cladding glass can be selected to be absorbing to the emitted photons, ie "Black Glass." This "Black Glass" attenuates those emitted photons which are not totally internally reflected from entering the next capillary, as shown schematically in FIG. 13. This is an important feature of our design, as light spreading into adjacent capillaries may reduce the resolution of our device. With this "Black Glass," scintillating light is absorbed up to a maximum of 680 nm, which covers the range applicable to current scintillating materials.

Figure 12:
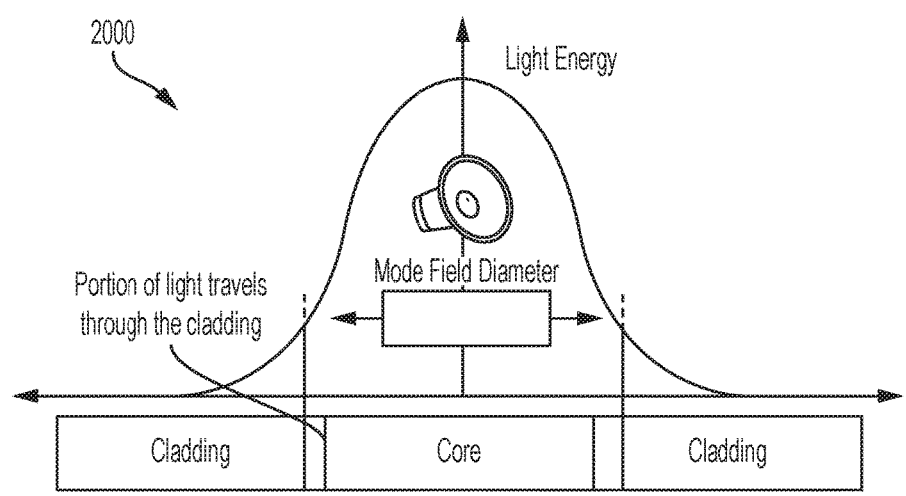
FIG. 12 illustrates the mode field diameter extending beyond the capillary walls.

FIG. 12 shows a schematic 2000 illustrating the distribution of the evanescent field of the emitted photons, which can be described as a wave confined by the capillary through total internal reflection. It can be seen that a portion of the evanescent field extends into the absorbing "Black Glass" of the cladding. This absorbs a portion of the emitted photons, reducing the efficiency of the design.

This continuation in part describes methods to improve the efficiency of the scintillating collimator by reducing the losses associated with the absorbed portion of the evanescent wave. This is achieved by including a transparent interfacial layer between core and cladding, as illustrated in FIG. 13. The interfacial layer can be one of a variety of optically transparent materials with a refractive index $n_3$ equal to that of the cladding, or lower. Its thickness is dependent on its refractive index, chosen to coincide with the extended evanescent wave illustrated in FIG. 12, and is therefore about 1 micron thick, or less. The materials include transparent glass, formed in conjunction with the "Black Glass" cladding by methods known to those skilled in forming collimated bundles; or vapor deposited SiO2; or a low index polymer. FIG. 13 illustrates a schematic view 3000 of a scintillating collimator with a low index polymer interfacial layer. A wide variety of low index polymers could be used.

Figure 14A:
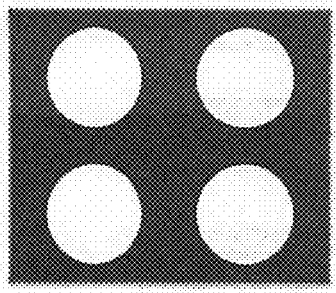
FIGS. 14A, 14B and 14C illustrate an exemplary method of how the low index transparent scintillating polymer is placed in the capillary holes.
Figure 14B:
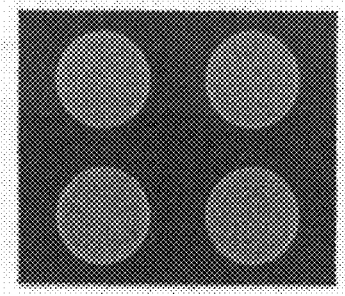
Figure 14C:
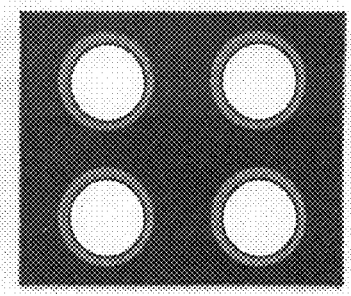

FIG. 14A, FIG. 14B and FIG. 14C illustrate an exemplary method of how the low index polymer may be placed in the capillary holes.

FIG. 14A illustrates the 5 micron capillary holes of a micro-capillary plate empty, i.e., cladding glass with no holes filled.

In FIG. 14B, each hole is pressurized with the low index polymer.

In FIG. 14C, the low index polymer is blown out of the capillary under pressure, leaving an approximately one micron thick low index coating. The coating is cured by ultra-violate light and the scintillating polymer subsequently pressed into the cladding.

An alternative method is to deposit the low index coating by a vapor phase deposition technique. Atomic layer deposition (ALD) is a preferred method due to the uniformity of the deposition method.

A further method to improve the efficiency of the scintillating plate described in this Continuation-in-Part is by providing a reflective coating on the entrance surface of the scintillating plate. Emitted photons may be emitted back towards the X-ray source instead of towards the photodetector, resulting in a loss of efficiency. As a result a reflective coating is placed on the surface of the scintillating plate that is facing towards the X-ray source, thus reflecting these photons back towards the photodetector, as illustrated in FIG. 13.

In summary, the scintillating collimation plate for x-rays of the present invention depends on the Total Internal Reflection, i.e., the difference between the refractive index in the core and the cladding. This application provides several improvements that increase the efficiency or resolution of the scintillating plate device. The addition of high index particles to the scintillating polymer or scintillating polymer matrix increases refractive index of the core, and thus the refractive index difference between core and coating, thereby improving the total internal reflection. The low index interfacial coating polymer, which has an index equal to or lower than the glass of the cladding, is formed on the sides on the glass wall of the capillary and is of the order of one micron thick, or less. Absorption of that part of the evanescent field which encroaches into the cladding is therefore reduced. Similarly, the reflective coating surface increases the yield of photoemission reaching the photodetector.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
providing a collimated bundle having a glass preform with a plurality of capillaries therethrough known in the industry as a glass capillary array;
infusing the glass capillary array with a scintillating polymer;
placing the collimated bundle in a pressure vessel;
applying pressure to the scintillating polymer;
driving it into the capillaries; and
applying a back pressure to the collimated bundle, the back pressure reducing the risk of failure of the collimated bundle.

2. The method of claim 1 wherein the back pressure is applied by a high pressure gas.

3. A method comprising:
providing a micro-capillary plate having a plurality of capillary openings;
filling the plurality of capillary openings with a low index polymer;
blowing out the plurality of capillary openings under pressure to leave a layer of low index wall coating; and
curing the low index wall coating with ultraviolet light.

* * * * *